United States Patent Office 3,184,900
Patented May 25, 1965

3,184,900
METHOD OF PURIFYING GASEOUS FORMALDEHYDE
Franco Codignola, Cesare Reni, and Jakob Ackermann, Milan, Italy, assignors to Societa Italiana Resine, Milan, Italy
No Drawing. Filed Oct. 15, 1962, Ser. No. 230,671
Claims priority, application Italy, Oct. 30, 1961, 19,568/61
4 Claims. (Cl. 55—31)

This invention relates to a method of preparing substantially anhydrous pure nonomeric formaldehyde suitable for manufacturing polyoxymethylene of high molecular weight.

It is known that raw gaseous formaldehyde, such as is for instance obtained by pyrolysis of commercial paraformaldehyde can be purified by conveying it over exchangers which cool it down to suitable temperatures, which results in a partial polymerization blocking within the polymer the impurities contained in the raw gaseous formaldehyde, which would disturb the polymerization of monomeric formaldehyde and give rise to the formation of poloxymethylenes of low molecular weight of no commercial valve.

The gaseous monomeric formaldehyde which has been thereby deprived of its impurities is suitable for use in preparing polyoxymethylenes of high molecular weight (H. Staudinger, Die Chemie der hochmolekularen organischen Verbindungen, Berlin, Springer (1932) page 280; and E. Ufer, Journ. prakt. Chem., 1926, 113, 105).

A technical method taking advantage of the principle of a partial polymerization depicted above is disclosed by U.S. Patent 2,824,051, of February 18, 1958, assignee E. I. du Pont de Nemours.

However, the last mentioned method suffers from heavy disadvantages both from a technological and operational point of view, in that it leads to a considerable loss of formaldehyde, the operation being complicated owing to the necessity of continuous mechanical cleaning of the exchangers.

More recent purifying methods employ washing liquids, such as dimethyl ether of tetraethylene glycol, which succeeds in purifying gaseous formaldehyde at a relatively high temperature (U.S. Patent 2,780,652, of February 5, 1957, assignee E. I. du Pont de Nemours), or cyclohexanolhemiformal which acts at low temperatures (Belgian Patent 566,293, of March 31, 1958, assignee E. I. du Pont de Nemours).

The last mentioned methods, which are technically suitable for purifying formaldehyde for preparing polyoxymethylenes of high molecular weight, are objectionable owing to the expensiveness of the product employed, which on account of losses in regeneration of the washing liquid considerably affects the final cost of the polymer obtained.

The impurities contained in a raw formaldehyde (such as obtained by pyrolysis of commercial paraformaldehyde) are water, methyl alcohol, formic acid and their mutual reaction products.

It has now been found that surprisingly improved results can be obtained by adsorbing the impurities on alkali or alkaline earth metal solid salts of ion-exchange resins of an acidic character.

The improved method therefore comprises contacting raw gaseous formaldehyde with a solid adsorbent comprising an alkali and/or alkaline earth metal salt of an ion-exchange resin, capable of being regenerated either by stripping by means of an inert gas or in a vacuum, at a temperature exceeding the adsorbing temperature but lower than the decomposition temperature of the resin.

According to an embodiment of the method raw gaseous formaldehyde is conveyed through tubes containing the adsorbent in a fixed bed.

According to another embodiment, raw gaseous formaldehyde is conveyed in counter-current to the moving adsorbent by utilizing the moving bed principle.

According to a still further embodiment, gaseous formaldehyde is passed through the adsorbent maintained in a turbulent suspension by the gasous stream of formaldehyde itself (fluidized bed).

Useful temperatures for carrying out the method range between $-20°$ C. and $+180°$ C., preferably between $+80$ and $+140°$ C. The method is more particularly convenient for raw gaseous formaldehyde of a minimum purity of 90%.

Where formaldehyde obtained from paraformaldehyde with a high impurity content is used, operation is conveniently carried out in two columns in series, the former of which is at a temperature exceeding $100°$ C. in order to avoid any polymerization of formaldehyde during the purifying step and ensuing obstruction of the columns, the latter column being at a temperature lower than $100°$ C. in order to improve the adsorbing effectiveness of the substance employed.

We preferably employ the purposes of this invention as adsorbents alkali- and/or alkaline-earth metal salts of ion-exchange resins of a sulphonated polystyrene or polyphenol, or carboxylated polyphenol, or polyacrylic acid resin.

The pressure applied throughout the adsorption stage is generally one atmosphere, except for the pressure head necessary for conveying the gasous formaldehyde through the apparatus. No convenience is seen in applying substantial super-atmospheric pressures.

The following examples will explain the nature of this invention without imposing any limitation thereon.

EXAMPLE 1

A commercial ion-exchange resin, in the form of a potassium salt of sulphonated polystyrene, such as Amberlite IRC–120, is sieved to a size of the particles ranging between 0.5 and 1 mm.

The resin prepared as above is poured into a column of a diameter of 3.1 cm, 70 cm. high to a bed depth of 60 cm.

The column is provided with an oil circulating jacket, the oil being separately heated in a thermo-statically controlled heater.

The column is heated to $140°$ C. and the resin dried over 25 hours by a flow of nitrogen of high purity (120 l./h.) dried molecular sieves.

Supply of raw gaseous formaldehyde is then started at a rate of 1 litre/minute (S.T.P.) at a temperature of $120°$ C.

The gaseous formaldehyde is obtained by pyrolysis of commercial paraformaldehyde of 96% purity, the impurities consisting nearly all of water.

The gaseous formaldehyde issuing at the top of the purifying column is analyzed by gaseous chromatography in a gaseous condition and discloses the presence of less than 0.05% water before it is condensed to a liquid state or is conveyed to a polymerization reactor.

The formaldehyde flow is intercepted after 70 minutes and dry nitrogen is caused to flow through the column, the temperature in the column being raised to $140°$ C., at a rate of flow of 2 liters/minute (S.T.P.) during 100 minutes. In this manner all the impurities adsorbed in the column are removed, the column being ready for a further cycle.

The quantity of adsorbed formaldehyde together with water and further impurities is very small, about twice the adsorbed water.

EXAMPLE 2

Operation is carried out in accordance with Example 1, by using an identical apparatus.

The ion-exchange resin is a polyacrylic one, such as Amberlite IRC-50 in the form of its sodium salt.

The column operates during 2 h. 30 minutes without any need for regeneration, and yields formaldehyde with a water content lower than 0.1%. The adsorbed formaldehyde amounts to 2% only of the quantity of resin employed.

Regeneration is carried out similarly as in Example 1.

EXAMPLE 3

The method, paraformaldehyde to be pyrolized and operation are the same as in Examples 1 and 2; potassium salt of Duolite C-25 (sulfonated polystyrene resin) is employed as adsorbent.

The results are substantially the same as in Example 2.

EXAMPLE 4

The apparatus is a unit comprising two columns in series, for the purpose of continuous operation, the columns effecting adsorption and regeneration, respectively.

The system is currently termed a "moving bed," the adsorbing material being transferred from a column to the other by gravity.

The regeneration column is maintained at temperature of 170° C., the adsorption column being maintained at 100° C.

The two columns, which are similar to each other, are of the following size:

Bore = 3.1 cm.
Height = 70 cm.

Both columns are provided with an oil circulating jacket, the oil being separately heated in a thermostat.

The gaseous formaldehyde is generated from 97.5% commercial paraformaldehyde, the difference up to 100 comprising almost totally water.

The paraformaldehyde is suspended in dioctyl phthalate and pyrolized at about 170° C.

The resulting gaseous formaldehyde is metered and conveyed to the bottom of the adsorption column at a rate of 1.5 liters/minute (S.T.P.) and issues at the top with a purity of 99.95%.

The ion-exchange resin Amberlite IR-200 is poured from the top into the column, said resin being in the form of its potassium salt which has been preliminarily dried as described in Example 1.

The resin is fed to the column at a rate of 5 cc./min. (4 grams per minute).

The granules of resin are continuously transferred from the bottom of the adsorption column to the top of the regenerating column in which they descend in countercurrent to a nitrogen flow of 3 liters/min. (S.T.P.).

The resin is transferred from the bottom of the second column to an intermediate container from which it is again transferred to the top of the first column for carrying out a further adsorption and regeneration cycle.

EXAMPLE 5

The same apparatus as described in Example 4 comprising calcium salt of Zeolite 226 resin is employed.

Formaldehyde is obtained with a purity of 99.9% to 99.95%, the same formaldehyde, nitrogen and resin flows being employed as described in Example 4.

As is well known, the extent of polymerization of formaldehyde depends upon the degree of purity of the starting monomer. It is therefore possible to obtain a polymer of a predetermined polymerization extent by starting from formaldehyde of a conveniently selected degree of purity.

With the improved method the degree of purity of gaseous formaldehyde, hence the extent of polymerization of the polymer resulting therefrom can be varied by merely adjusting the degree of regeneration of the ion-exchange resin salt.

This will be illustrated by the following example:

EXAMPLE 6

The same apparatus and procedure as in Example 1 are employed; however, the column is 1.30 m. high.

Two tests are carried out at a temperature of 110° C., Amberlite IR-200 in the form of its potassium salt being used as adsorbent, different regeneration degrees being applied in the tests.

In the first test the resin employed had been regenerated to 0.01% residue water content.

In the second test the resin had been regenerated to 0.05% residue water content.

In both tests the water content in the formaldehyde issuing from the adsorbing column was ascertained, with different ratios of the quantity of purified formaldehyde to the quantity of adsorbent resin employed.

The results of the tests are summarized in the following table:

*Table*

| Quantity of purified $CH_2O$ with respect to the quantity of adsorbent | Water content in formaldehyde issuing from the column | |
|---|---|---|
| | Test 1, percent | Test 2, percent |
| 50 | 0.03 | 0.07 |
| 200 | 0.02 | 0.07 |
| 400 | 0.03 | 0.06 |
| 600 | 0.02 | 0.06 |
| 800 | 0.02 | 0.07 |
| 1,000 | *0.04 | *0.07 |
| 1,200 | 0.50 | 0.90 |
| 1,400 | 1.6 | 1.5 |

*Point of saturation.

The results summarized in the table show that the purity of formaldehyde is higher as the extent of regeneration of the absorbent resin increases.

Polymerization of formaldehyde obtained by the two sets of tests yields polymers of various polymerization extent, hence of different inherent viscosities which in the specific case amount to $\eta=3.5$ in respect of the polymer of formaldehyde from Test 1, and $\eta=1.6$ in respect of polymer of formaldehyde from Test 2.

What we claim is:

1. The method of purifying raw gaseous monomeric formaldehyde containing impurities comprising water, methyl alcohol and formic acid, wherein a flow of the gaseous formaldehyde is contacted with a solid adsorbent selected from the group consisting of alkali metal salts of an acidic ion exchange resin and alkaline earth metal salts of an acid ion exchange resin, said resin being selected from the group consisting of sulphonated polystyrene, sulphonated polyphenol, and cross-linked polyacrylic resins and wherein the exhausted adsorbent is regenerated at a temperature higher than the adsorption temperature.

2. The method of purifying raw gaseous monomeric formaldehyde containing impurities comprising water, methyl alcohol and formic acid, wherein a flow of the gaseous formaldehyde is contacted with a solid adsorbent selected from the group consisting of alkali metal salts of an acidic ion exchange resin and alkaline earth metal salts of an acidic ion exchange resin, said resin being selected from the group consisting of sulphonated polystyrene, sulphonated polyphenol, and cross-linked polyacrylic resins at a temperature between —20° C. and +180° C., and wherein the exhausted adsorbent is regenerated by stripping at a temperature higher than the adsorption temperature.

3. The method of purifying a raw gaseous monomeric formaldehyde from impurities comprising water, methyl alcohol and formic acid, wherein a flow of the gaseous formaldehyde is contacted with a solid adsorbent selected from the group consisting of alkali metal salts of an acidic ion exchange resin and alkaline earth metal salts of an acidic ion exchange resin, said resin being selected from the group consisting of sulfonated polystyrene, sulphonated polyphenol, and cross-linked polyacrylic resins, at a temperature between −20° C. and +180° C., and wherein the exhausted adsorbent is regenerated by stripping with a dry inert gas at a temperature higher than the adsorption temperature.

4. The method of purifying raw gaseous monomeric formaldehyde containing impurities comprising water, methyl alcohol and formic acid, wherein a flow of the gaseous formaldehyde is contacted in a first stage at a temperature of from 100° C. to 180° C., and then in a second stage at a temperature of from −20° C. to 100° C with a solid adsorbent selected from the group consisting of alkali metal salts of an acidic ion exchange resin and alkaline earth metal salts of an acidic ion exchange resin, said resin being selected from the group consisting of sulphonated polystyrene, sulphonated polyphenol, and cross-linked polyacrylic resins, and wherein the adsorbents employed in the first- and second stage are subsequently freed from said impurities by stripping with a dry inert gas at temperatures higher than their respective adsorption temperatures in the respective stages.

References Cited by the Examiner

UNITED STATES PATENTS

| | | | |
|---|---|---|---|
| 2,910,139 | 10/59 | Matyear | 55—75 |
| 3,118,747 | 1/65 | Codignola et al. | 55—53 |

REUBEN FRIEDMAN, *Primary Examiner.*